Oct. 14, 1941.　　　P. WOLAVER　　　2,259,333
CALENDAR
Filed Feb. 27, 1939　　　3 Sheets-Sheet 1
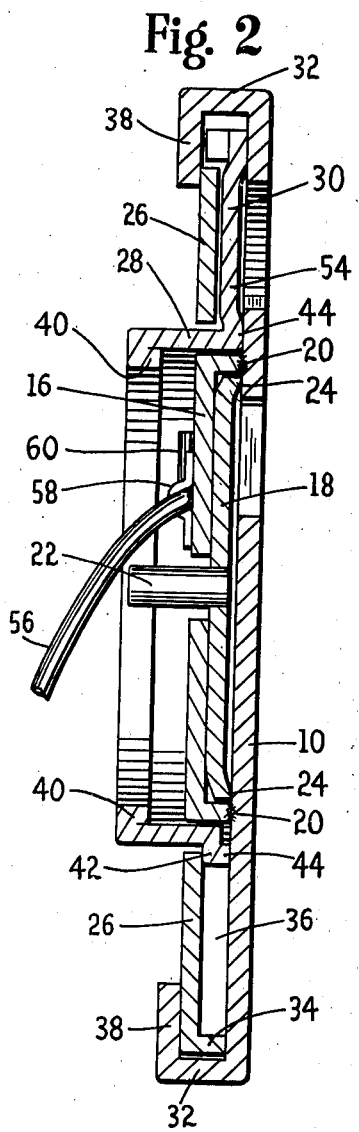
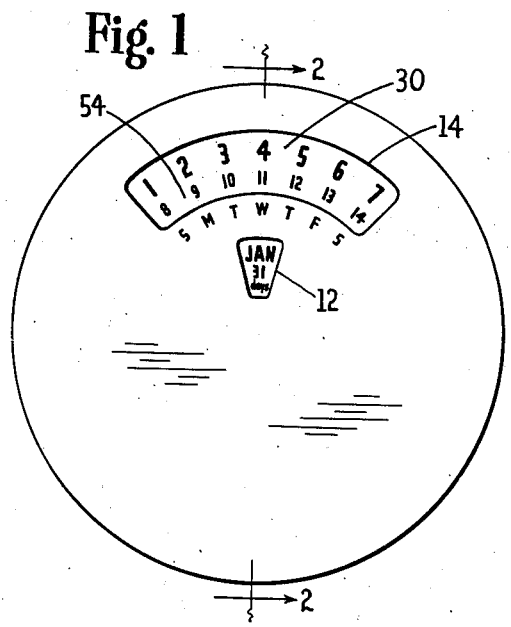
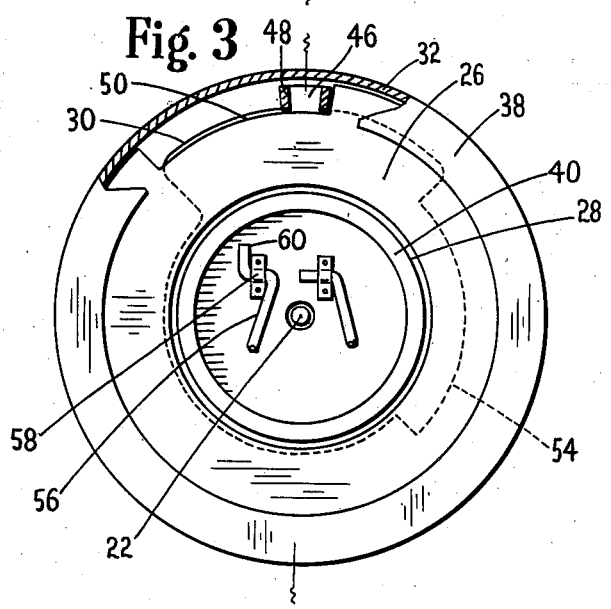
Park Wolaver
INVENTOR.
BY Freeman, Sweet, Albrecht & Weidman
ATTORNEYS.

Oct. 14, 1941.    P. WOLAVER    2,259,333
CALENDAR
Filed Feb. 27, 1939    3 Sheets-Sheet 2

Park Wolaver
INVENTOR.
BY
Freeman, Sweet, Albrecht & Weidman
ATTORNEYS.

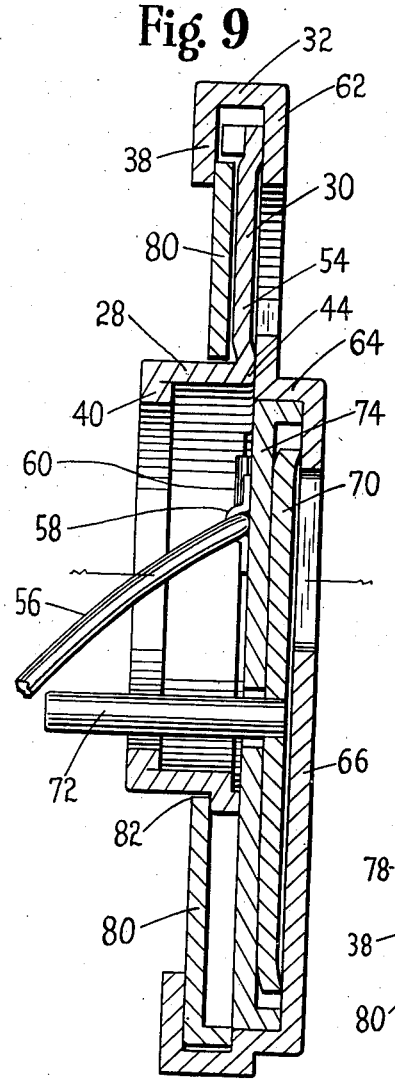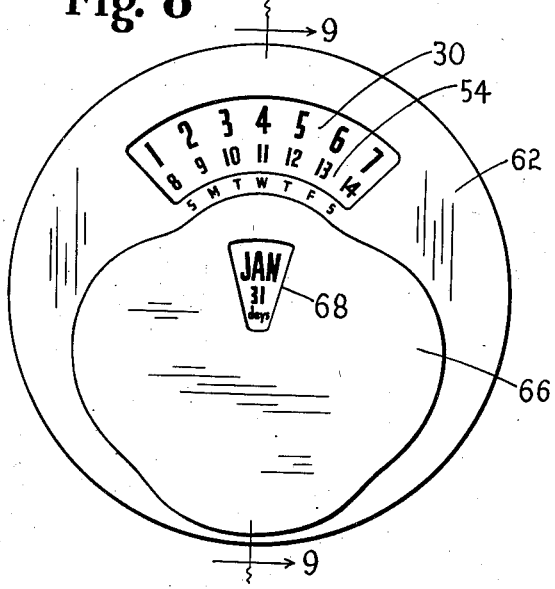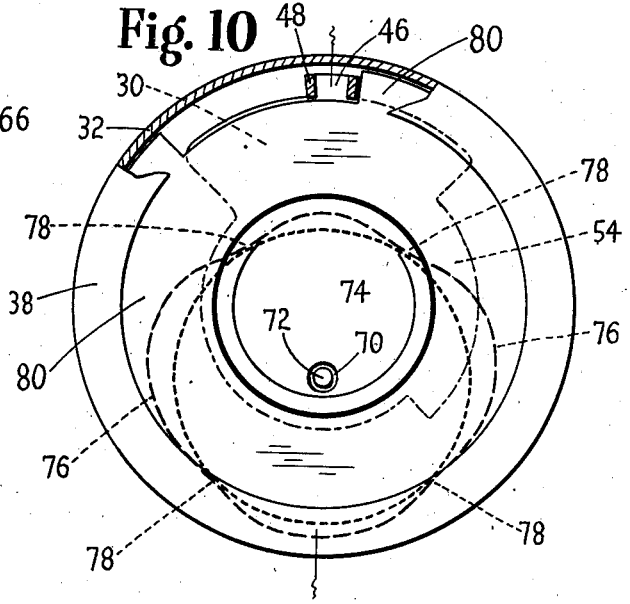

Patented Oct. 14, 1941

2,259,333

UNITED STATES PATENT OFFICE 2,259,333

CALENDAR

Park Wolaver, Chicago, Ill.

Application February 27, 1939, Serial No. 258,628

18 Claims. (Cl. 40—115)

My invention relates to calendars and includes among its objects and advantages greater simplicity and durability in the type of calendar that only requires readjustment at intervals of several days.

In the accompanying drawings:

Figure 1 is a front elevation of a calendar according to the invention;

Figure 2 is a section on line 2—2 of Figure 1;

Figure 3 is a rear view of the same calendar with part of the casing broken away;

Figure 8 is a view similar to Figure 1 showing a modified construction;

Figure 9 is a section on line 9—9 of Figure 8; and

Figure 10 is a rear view of the calendar of Figure 8 with the casing partly broken away.

Figure 4:
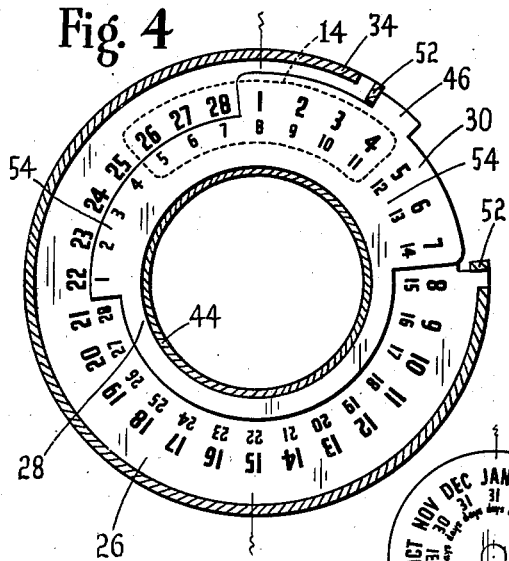
Figure 4 is a front elevation of the indicator segments without the casing in one condition of adjustment.

In the embodiment of the invention selected for illustration in Figures 1 to 7, inclusive, the casing 10 is a flat disc apertured at 12 to show the indicia for the month, and at 14 to show number indicia for two weeks. Coaxial with the main housing I provide a housing 16 for the month dial 18, which housing may be fastened to the disc 10 as by soldering or welding at 20. The housing 16 has a central axial opening, and the months' dial 18 carries a rearwardly projecting stud 22 by means of which the dial may be manipulated. I have illustrated the edge of the dial 18 cupped forwardly as at 24 to keep a portion of the surface carrying the indicia from rubbing against the disc 10. Upon reference to Figure 6 it will be noted that the months' dial 18 carries all twelve months of the year, and under each month in smaller indicia, the number of days in that month, as a convenient reminder to the user.

The mechanism for indicating the days of the month comprises an underlying annulus 26 and an overlying annulus 28 carrying a radially extended segment 30 overlying part of the annulus 26. The annulus 26 is rotatably supported by peripheral engagement with the main housing, specifically with the rearwardly turned cylindrical portion 32 of the main housing. Throughout most of its periphery the annulus 26 has a forwardly extending lip 34 by means of which the main body of the annulus is held rearwardly spaced from the disc 10 to define a space 36 within which the segment 30 is housed. The rearwardly extending portion 32 is continued in an inwardly extending lip 38 so that the annulus 26 is held against axial displacement in either direction between the lip 38 and the disc 10.

The annulus 28 comprises a ring-shaped portion, the rear edge of which may be rolled over as at 40 to avoid having a sharp metal edge. It is restrained from radial displacement by peripheral engagement of the ring 28 with the outer periphery of the housing 16 for the month dial. It is restrained against axial movement forward by the disc 10 and against axial movement rearward by engagement with the inner edge of the annulus 26, having an outwardly turned flange 42 overlapping the inner edge of the annulus 26 for this purpose. In common with the month dial 18 it has a lip 44 extending forwardly slightly, enough to keep the indicia-carrying portion of the segment 30 from rubbing against the disc 10.

I have provided a lost motion connection between the annulus 28 with its segment 30 and the underlying annulus 26. As illustrated, the outer periphery of the segment 30 is provided with an extension 46 and two lugs 48 projecting rearwardly into the plane of the underlying annulus 26. And the outer periphery of the underlying annulus 26 is notched at 50 to receive the lugs 48 and establish a lost motion connection with a predetermined amount of lost motion between the parts. As illustrated, the lip 34 is interrupted, and the metal on either side of the notch 50 is turned forward to form lugs 52 positioned to engage the lugs 48 and provide a substantial contact area to secure durability and reduce wear.

Figure 5:
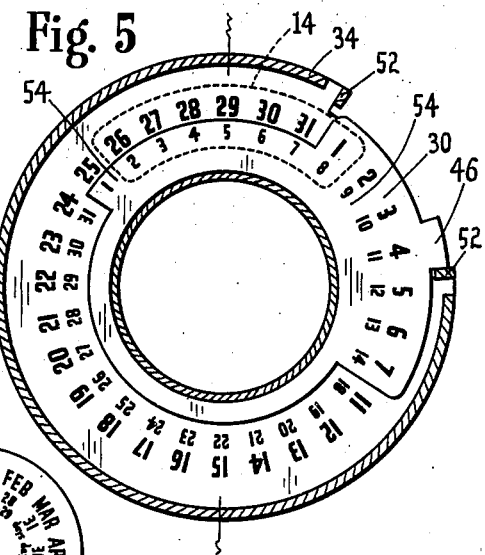
Figure 5 is a view of the same parts in a different condition of adjustment.
Figure 6:
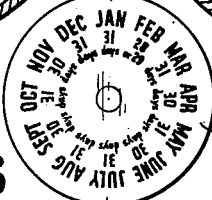
Figure 6 is a front elevation of the months' dial.
Figure 7:
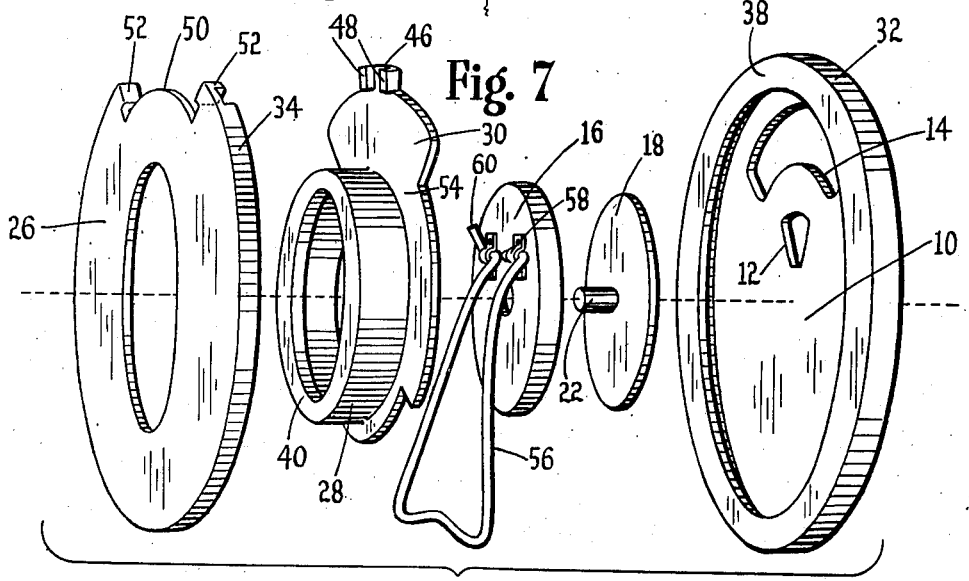
Figure 7 is a perspective view of all the parts disassembled so as to show the manner of assembly.

As illustrated in Figures 1, 4, and 5, the annulus 26 and the segment 30 are provided with two sets of number indicia, an outer larger set functioning to designate the current week, and an inner smaller set which will be discussed later. Referring to the outer larger set, the leading or left hand edge of the segment 30 as viewed in Figure 4 carries the numeral 1, which is followed by numerals 2, 3, and 4, and so on to the end of the segment. While I have illustrated the segment as carrying seven numbers, it will be apparent after the operation of the device has been explained, that this number is not essential and that the segment might carry any number of the indicia between 3 and 28.

The rear or trailing edge of the underlying annulus 26 carries the number 31, and next it proceeding in counterclockwise direction the numerals 30, 29, 28, and so on, in this instance down to the number 8, since the number 7 is on the segment.

Manipulation of the parts by the user is by grasping the ring 26, and turning the inner annulus 28 and segment 30. For the ordinary purpose of advancing from week to week, the direction of rotation is counterclockwise as viewed in Figures 1, 4, and 5, so that the parts are in the relative positions of Figure 4, remaining in these relative positions during successive displacement of seven days each throughout the month. Thus, for instance, beginning with the position of Figure 1 indicating that the first of January is Sunday, the next seven day displacement by the user will bring numbers 8 to 14, inclusive, in register with the opening 14 for the second week, numbers 15 to 21, inclusive, for the third week, and numbers 22 to 28, inclusive, for the fourth week. But on the 29th of January, the user will want number 29 on the underlying annulus 26 in the position for Sunday, and number 1 on the segment in the position for Wednesday. To accomplish this adjustment, the user simply rotates the annulus 28 to the position of Figure 1, and then moves it in the opposite direction to bring #1 on the segment into the position for Wednesday, thereby exposing numbers 29, 30, and 31 on the underlying annulus 26, which underlying annulus will not be displaced during the reverse movement of the segment because of the lost motion connection. This sets all the parts in proper position for the next three days, and on Wednesday the user need only turn the months' dial 1/12th of a revolution to bring February into register with the opening 12.

Similarly, it will be obvious that for months having 28, 29, or 30 days, the user can position the parts very quickly and simply in the desired relative position, by moving the segment back either not at all for a month of twenty-eight days, one day for a month of 29 days and two days for a month of 30 days.

Referring now to the inner row of indicia, which indicate the days of the week succeeding the current week, the segment 30 is integral with a circumferential extension 54 offset seven days in advance of the segment 30 and carrying the same indicia as the segment 30. To avoid mechanical weakness I prefer to continue the circumferential extension 54 clockwise inside the segment 30 through the numbers 8 to 14, inclusive, as illustrated. Accordingly, the underlying annulus 26 carries the small number 31 inside the large number 24 and so on progressively back to the number 15, which is the smallest number that will be exposed by the overlying segments in the relative positions of Figure 4. It will be obvious that by merely continuing the same principle it would be possible to indicate a third week in the same way with the overlying segment carrying numbers 1 to 21, inclusive, and the underlying annulus carrying numbers 22 to 31, inclusive.

I have illustrated the small casing 16 for the months' dial 18 provided with a brace 56 pivoted in ears 58 and limited in its outward movement as by an angular extension 60 on one of the pintles.

Referring now to Figures 8 to 10, inclusive, the housing 62 differs from the housing of Figure 2 in having an eccentric offset portion extending forwardly at 64 to define a smaller face 66 apertured at 68 to expose the months' dial 70 which may be identical with the months' dial 18 except that its stud 72 needs to be somewhat longer than the stud 22. The months' dial 70 is held in place by the small housing 74 telescoped inside the offset 64. I prefer to form this extension of non-circular configuration as clearly indicated in full lines in Figure 8, and the housing 74 is of similar configuration so that its inner peripheral surface occupies the position indicated by the dash line 76 in Figure 10. Accordingly, the months' dial 70 has peripheral engagement at four spaced points 78, as indicated in Figure 10, instead of around its entire periphery. The non-circular form of the housing 74 insures perfect alignment in assembly for the housing 74 and the brace 56 carried thereby.

The annulus 28 and segment 30 may be of identical configuration with the showing of Figures 1 and 2, but because the months' dial is eccentric, I provide an underlying annulus 80 that extends inward at 82 for peripheral engagement with the outer periphery of the annulus 28 to guide and support the annulus 28 and segment 30.

Desk calendars operated by mechanical adjustment by the user are well known in the art, but most of the successful ones require daily adjustment. In any desk calendar, mechanical or otherwise, requiring daily adjustment, the common difficulty of a user who is even a little absent-minded is to remember during the forenoon whether he has adjusted the calendar or not, and often such calendars produce more confusion than they avoid for this reason.

Calendars requiring weekly adjustment are also not new, but, so far as I am aware, no such calendar is known in which the transition from one month to the next can be taken care of by such a simple and obvious manipulation as I have disclosed.

Without further elaboration the foregoing will so fully explain my invention that others may, by applying knowledge current at the time of application, readily adapt the same for use under various conditions of service. It will, for instance, be entirely obvious that the annulus 26 is of annular form only for the purposes of mechanical strength and convenience in manufacture, and that it would be equally operative if the portion of it underlying the notch 50 were omitted. Similarly, while the indicia-carrying portions of the parts have been indicated as plane, it will be obvious that part, or all, of them might be defined by surfaces of revolution about a central axis, generated by movement of a line which might have any orientation other than the perpendicular relationship of the drawings, and which might be straight, curved, or serrated.

I claim:

1. In a calendar: a housing, two day-indicia members including an underlying annulus and an overlying segment rotatably mounted in said housing; a lost motion connection between said members permitting relative motion corresponding to at least three days; manual adjustment means accessible to the user for moving one of said elements only; said overlying segment carrying indicia beginning with 1 and increasing in one first direction, and said underlying annulus carrying indicia at the same radial position beginning with 31 and decreasing in the opposite direction down to a number one greater than the largest number on said segment; said lost motion connection permitting said segment to have relative movement in the opposite direction until its number 1 is adjacent number 28 on said underlying annulus, and in said first direction until its number 1 is adjacent 31 on said underlying annulus; an independent months' dial in said same housing concentric with said indicia members, carrying indicia indicating the months of the year and smaller indicia adjacent each month stating the number of days in each month; and manual means for independent manipulation of said months' dial; said overlying segment having a portion at a smaller radius, offset seven days ahead of said first mentioned indicia; said underlying annulus having a second set of indicia offset seven days ahead of its first mentioned indicia; said smaller radius portion of said segment being seven days longer than the outer portion of said segment.

2. In a calendar: a housing, two day-indicia members including an underlying annulus and an overlying segment rotatably mounted in said housing; a lost motion connection between said members permitting relative motion corresponding to at least three days; manual adjustment means accessible to the user for moving one of said elements; said overlying segment carrying indicia beginning with 1 and increasing in one first direction, and said underlying annulus carrying indicia in alignment with said overlying indicia and beginning with 31 and decreasing in the opposite direction down to a number one greater than the largest number on said segment; said lost motion connection permitting said segment to have relative movement in the opposite direction until its number 1 is adjacent number 28 on said underlying annulus, and in said first direction until its number 1 is adjacent 31 on said underlying annulus; an independent months' dial in said same housing concentric with said indicia members, carrying indicia indicating the months of the year; and manual means for independent manipulation of said months' dial.

3. In a calendar: a support, two day-indicia members including an underlying annulus and an overlying segment rotatably mounted on said support; a lost motion connection between said member permitting relative motion; adjustment means for moving one of said members; said overlying segment carrying indicia beginning with 1 and increasing in one first direction, and said underlying annulus carrying indicia in alignment with said overlying indicia and beginning with 31 and decreasing in the opposite direction down to a number one greater than the largest number on said segment; said lost motion connection permitting said segment to have relative movement in the opposite direction until its number 1 is adjacent number 28 on said underlying annulus, and in said first direction until its number 1 is adjacent 31 on said underlying annulus; said overlying segment having an offset portion offset seven days ahead of said first mentioned indicia; said underlying annulus having a second set of indicia offset seven days ahead of its first mentioned indicia.

4. In a calendar: a support, two day-indicia members including an underlying annulus and an overlying segment rotatably mounted on said support; a lost motion connection between said members permitting relative motion; adjustment means for moving one of said members; said overlying segment carrying indicia beginning with 1 and increasing in one first direction, and said underlying annulus carrying indicia in alignment with said overlying indicia and beginning with 31 and decreasing in the opposite direction down to a number one greater than the largest number on said segment; said lost motion connection permitting said segment to have relative movement in the opposite direction until its number 1 is adjacent number 28 on said underlying annulus, and in said first direction until its number 1 is adjacent 31 on said underlying annulus.

5. In a calendar: a support, two day-indicia members including an underlying annulus and an overlying segment rotatably mounted on said support; a lost motion connection between said members permitting relative motion; adjustment means for moving said segment; said segment carrying indicia beginning with 1 and increasing in one first direction, and said underlying annulus carrying indicia in alignment with said overlying indicia and beginning with 31 and decreasing in the opposite direction down to a number one greater than the largest number on said segment; said lost motion connection permitting said segment to have relative movement in the opposite direction until its number 1 is adjacent number 28 on said underlying annulus, and in said first direction until its number 1 is adjacent 31 on said underlying annulus.

6. In a calendar: a support, two day-indicia members including an underlying annulus and an overlying segment rotatably mounted on said support; a lost motion connection between said members permitting relative motion; adjustment means for moving one of said rotatably mounted members; said overlying segment carrying indicia beginning with 1 and increasing in one first direction, and said underlying annulus carrying indicia in alignment with said overlying indicia and beginning with 31 and decreasing in the opposite direction; said lost motion connection permitting said segment to have relative movement in the opposite direction until its number 1 is adjacent number 28 on said underlying annulus, and in said first direction until its number 1 is adjacent 31 on said underlying annulus; the smallest number on said annuulus being one greater than the largest number on said segment; said smallest annulus number lying adjacent said largest segment number, when said segment is moved to the limit of its relative movement in said opposite direction.

7. In a calendar: a housing, two day-indicia members including an underlying annulus and an overlying segment rotatably mounted in said housing; a lost motion connection between said members permitting relative motion; adjustment means for moving one of said rotatably mounted members; said overlying segment carrying indicia beginning with 1 and increasing in one first direction, and said underlying annulus carrying indicia in alignment with said overlying indicia and beginning with 31 and decreasing in the opposite direction; said lost motion connection permitting said segment to have relative movement in the opposite direction until its number 1 is adjacent number 28 on said underlying annulus, and in said first direction until its number 1 is adjacent 31 on said underlying annulus; the smallest number on said annulus being one greater than the largest number on said segment; said smallest annulus number lying adjacent said largest segment number, when said segment is moved to the limit of its relative movement in said opposite direction; and an independent months' dial eccentrically mounted with respect to said day-indicia members but within the same housing.

8. In a calendar: a support, two day-indicia members including an underlying annulus and an overlying segment rotatably mounted on said support; a lost motion connection between said members permitting relative motion; adjustment means for moving one of said members; said overlying segment carrying indicia beginning with 1 and increasing in one first direction, and said underlying annulus carrying indicia in alignment with said overlying indicia and beginning with 31 and decreasing in the opposite direction down to a number one greater than the largest number on said segment; said lost motion connection permitting said segment to have relative movement in the opposite direction until its number 1 is adjacent number 28 on said underlying annulus, and in said first direction until its number 1 is adjacent 31 on said underlying annulus; said overlying segment having an additional indicia-carrying portion carrying indicia offset seven days ahead of said first mentioned indicia; said additional indicia-carrying porton being also offset from said first mentioned indicia at an angle to the direction of motion of the parts; said underlying annulus having a second set of indicia offset seven days ahead of its first mentioned indicia.

9. A combination according to claim 4 in which the indicia-carrying portions of the members lie in planes normal to the axis of rotation.

10. In a calendar: a support; two rotary day-indicia members rotatable on said support; one of said members overlapping the other; a lost motion connection between said members; and means for moving one of said members to advance the calendar; one of said members carrying indicia for the beginning of the month; the other of said members carrying indicia for the end of the month; said lost motion connection permitting relative motion of the members for the beginning of the month in the direction for advancing the calendar up to a position where the indicia on said members exhibit an unbroken series of integers; said lost motion connection permitting retrograde relative motion of the member for the beginning of the month far enough to uncover the number 31 on the member for the end of the month; the member for the beginning of the month ending with the seventh day of the month.

11. In a calendar: a support; a first day-indicia member, and a second day-indicia member, rotatable on said support about a common axis; said members together carrying a circumferential series of indicia including each number from one to 31; the first part of the month being carried on one of said members; but not beyond number 21; the last part of the month being carried by said other member; said indicia being all at the same radius; one member being nearest the user and overlying said other member and being cut away at the radius of said indicia except where its own indicia are, to expose the underlying member; means for moving said first member to advance the calendar; a lost motion connection between said first and second members permitting lost motion corresponding to at least three days; the limit of lost motion in one direction positioning said members so that the highest number on the member carrying the first part of the month is followed on the other member by a number one greater, in which position the number 1 on the member carrying the first part of the month has moved at least far enough to cover the number 29 on the other member; a cover over both members, cut away to expose not more than the number of indicia carried by the member carrying the first part of the month; a separate months' dial pivoted on an eccentric axis parallel to the axis of said members but offset away from the cut-away portion of said cover; and a cover for said month's dial, cut away to expose one month of said month's dial adjacent the cut-away portion of said first mentioned cover.

12. In a calendar: a support; a first day-indicia member, and a second day-indicia member, rotatable on said support about a common axis; said members together carrying a circumferential series of indicia including each number from one to 31; the first part of the month being carried on one of said members, but not beyond number 21; the last part of the month being carried by said other member; said indicia being all at the same radius; one member being nearest the user and overlying said other member and being cut away at the radius of said indicia except where its own indicia are, to expose the underlying member; means for moving said first member to advance the calendar; a lost motion connection between said first and second members permitting lost motion corresponding to at least three days; the limit of lost motion in one direction positioning said members so that the highest number on the member carrying the first part of the month is followed on the other member by a number one greater, in which position the number 1 on the member carrying the first part of the month has moved at least far enough to cover the number 29 on the other member; a cover over both members, cut away to expose not more than the number of indicia carried by the member carrying the first part of the month.

13. In a calendar: a support; a first day-indicia member, and a second day-indicia member, rotatable on said support about a common axis; said members together carrying a circumferential series of indicia including each number from 1 to 31; the first part of the month being carried on one of said members, but not beyond number 21; the last part of the month being carried by said other member; said indicia being all at the same radius; one member being nearest the user and overlying said other member and being cut away at the radius of said indicia except where its own indicia are, to expose the underlying member; means for moving said first member to advance the calendar; and a lost motion connection between said first and second members permitting lost motion corresponding to at least three days; the limit of lost motion in one direction positioning said members so that the highest number on the member carrying the first part of the month is followed on the other member by a number one greater, in which position the number 1 on the member carrying the first part of the month has moved at least far enough to cover the number 29 on the other member.

14. In a calendar: a support; a first day-indicia member, and a second day-indicia member, rotatable on said support about a common axis; said members together carrying a circumferential series of indicia including each number from 1 to 31; the first part of the month being carried on one of said members, but not beyond number 21; the last part of the month being carried by said other member; said indicia being all at the same radius; one member being nearest the user and overlying said other member and being cut away at the radius of said indicia except where its own indicia are, to expose the underlying member; a lost motion connection between said first and second members permitting lost motion corresponding to at least three days; the limit of lost motion in one direction positioning said members so that the highest number on the member carrying the first part of the month is followed on the other member by a number one greater, in which position the number 1 on the member carrying the first part of the month has moved at least far enough to cover the number 29 on the other member; and means for moving said members to advance the calendar.

15. In a calendar: a support; a first day-indicia member and a second day-indicia member, rotatable on said support about a common axis; said members together carrying a circumferential series of indicia including each number from 1 to 31; the first part of the month being carried on one of said members, but not beyond number 21; the last part of the month being carried by said other member; said indicia being all at the same radius; one member being nearest the user and overlying said other member and being cut away at the radius of said indicia except where its own indicia are, to expose the underlying member; a lost motion connection between said first and second members permitting lost motion corresponding to at least three days; and means for moving said members to advance the calendar.

16. In a calendar: a support; two day-indicia members including an annulus and a segment rotatably mounted on said support; a lost motion connection between said members permitting relative motion corresponding to not less than three days; adjustment means for moving said members; one of said members carrying indicia beginning with 1 and increasing in one first direction; the other of said members carrying indicia in alignment with said first mentioned indicia and including the number 31 and decreasing in the opposite direction; said members together carrying all indicia between number 1 and number 31; said lost motion connection permitting said members to have relative movement in one direction at least until the number 1 on one member is covering number 29 on the other member, and in the opposite direction at least until the number 1 on one member is adjacent number 31 on the other member; one of said members having an offset portion carrying indicia offset seven days ahead of the other indicia on the same member.

17. In a calendar: a support; two day-indicia members including an annulus and a segment rotatably mounted on said support; a lost motion connection between said members permitting relative motion corresponding to not less than three days; adjustment means for moving said members; one of said members carrying indicia beginning with 1 and increasing in one first direction; the other of said members carrying indicia in alignment with said first mentioned indicia and including the number 31 and decreasing in the opposite direction; said members together carrying all indicia between number 1 and number 31; said lost motion connection permitting said members to have relative movement in one direction at least until the number 1 on one member is covering number 29 on the other member, and in the opposite direction at least until the number 1 on one member is adjacent number 31 on the other member.

18. In a calendar: a support; two rotatable day-indicia members mounted on said support; a first one of said members carrying a series of indicia beginning with 1; the second of said members carrying a series of indicia ending with 31; said members together carrying all the numbers from 1 to 31; said first member being positioned to partially cover said second member; and a lost motion connection between said members, permitting said first member to shift with respect to said second member from a position where number 1 on said first member is adjacent number 31 on said second member, into positions where number 1 on said first member is adjacent number 30, or 29, or 28; said first member being shaped and arranged to cover all numbers on said second member higher than the exposed number on said second member adjacent number 1 on said first member.

PARK WOLAVER.